US 6,647,785 B2

(12) United States Patent
Stewart et al.

(10) Patent No.: US 6,647,785 B2
(45) Date of Patent: Nov. 18, 2003

(54) NUCLEAR RADIATION HARD HIGH ACCURACY ROTATION SENSOR SYSTEM

(75) Inventors: Robert E. Stewart, Woodland Hills, CA (US); John T. Douglass, Woodland Hills, CA (US); Stanley F. Wyse, Encino, CA (US)

(73) Assignee: Litton Systems, Inc., Woodland Hills, CA (US)

( * ) Notice: Subject to any disclaimer, the term of this patent is extended or adjusted under 35 U.S.C. 154(b) by 91 days.

(21) Appl. No.: 09/916,997

(22) Filed: Jul. 27, 2001

(65) Prior Publication Data

US 2003/0019296 A1 Jan. 30, 2003

(51) Int. Cl.[7] .............................................. G01C 19/00
(52) U.S. Cl. ................................................... 73/504.13
(58) Field of Search ....................... 73/504.13; 701/221, 701/220

(56) References Cited

U.S. PATENT DOCUMENTS

| 4,088,026 A | | 5/1978 | Flanner |
| 4,106,094 A | * | 8/1978 | Land ............................ 701/220 |
| 4,157,041 A | | 6/1979 | Loper et al. |
| 4,254,465 A | * | 3/1981 | Land ............................ 701/220 |
| 4,541,023 A | | 9/1985 | Collette |
| 4,631,510 A | | 12/1986 | Nagarkatti et al. |
| 4,779,463 A | | 10/1988 | Woodruff |
| 4,926,690 A | | 5/1990 | Oberg |
| 4,951,508 A | | 8/1990 | Loper, Jr. et al. |
| 5,218,867 A | * | 6/1993 | Varnham et al. ......... 73/504.13 |
| 5,656,777 A | | 8/1997 | Petri et al. |
| 5,801,310 A | | 9/1998 | Matthews et al. |
| 5,983,719 A | | 11/1999 | Matthews et al. |
| 6,084,376 A | | 7/2000 | Piedl et al. |

* cited by examiner

Primary Examiner—Richard A. Moller
(74) Attorney, Agent, or Firm—Lynn & Lynn

(57) ABSTRACT

A rotation sensing system includes a rotation sensor that produces a signal in response to an input rotation about a sensing axis. A servo system is arranged to rotate the rotation sensor at an angle about the sensing axis to null the signal from the rotation sensor such that the rotation sensor is substantially inertially stable. The rotation sensing system is mounted on a resolver arranged to measure the angle through which the servo system has rotated the rotation sensor.

15 Claims, 2 Drawing Sheets

NUCLEAR RADIATION HARD HIGH ACCURACY ROTATION SENSOR SYSTEM

BACKGROUND OF THE INVENTION

This invention relates generally to navigation equipment and techniques. This invention relates particularly to rotation sensors.

SUMMARY OF THE INVENTION

A rotation sensing system according to the invention comprises a rotation sensor that produces a signal in response to an input rotation about a sensing axis. A servo system is arranged to rotate the rotation sensor at an angle about the sensing axis to null the signal from the rotation sensor such that the rotation sensor is substantially inertially stable. The invention further includes a resolver arranged to measure the angle through which the servo system has rotated the rotation sensor.

The rotation sensor preferably is comprised of a vibratory rotation sensor such as a hemispheric resonator gyroscope that includes a hemispherical resonator that supports standing wave vibrations and a signal pickoff arranged to provide the signal to the servo system.

The rotation sensing system according to the invention preferably further comprises a shaft connected between the resonator and the resolver with the shaft being arranged to rotate with the resonator.

The servo system preferably includes circuitry for processing signals output from the signal pickoff to produce a feedback signal and a servomotor connected to the shaft and arranged to receive the feedback signal and rotate the shaft and hemispheric resonator to null the signal output from the signal pickoff.

The resolver may be mounted on a vehicle and arranged to measure angular displacement between the vehicle and the rotation sensor.

BRIEF DESCRIPTION OF THE DRAWINGS

FIG. 4 is a block diagram of circuitry for processing signals output from the rotation sensing system of FIG. 1.

DETAILED DESCRIPTION OF THE INVENTION

Figure 1:
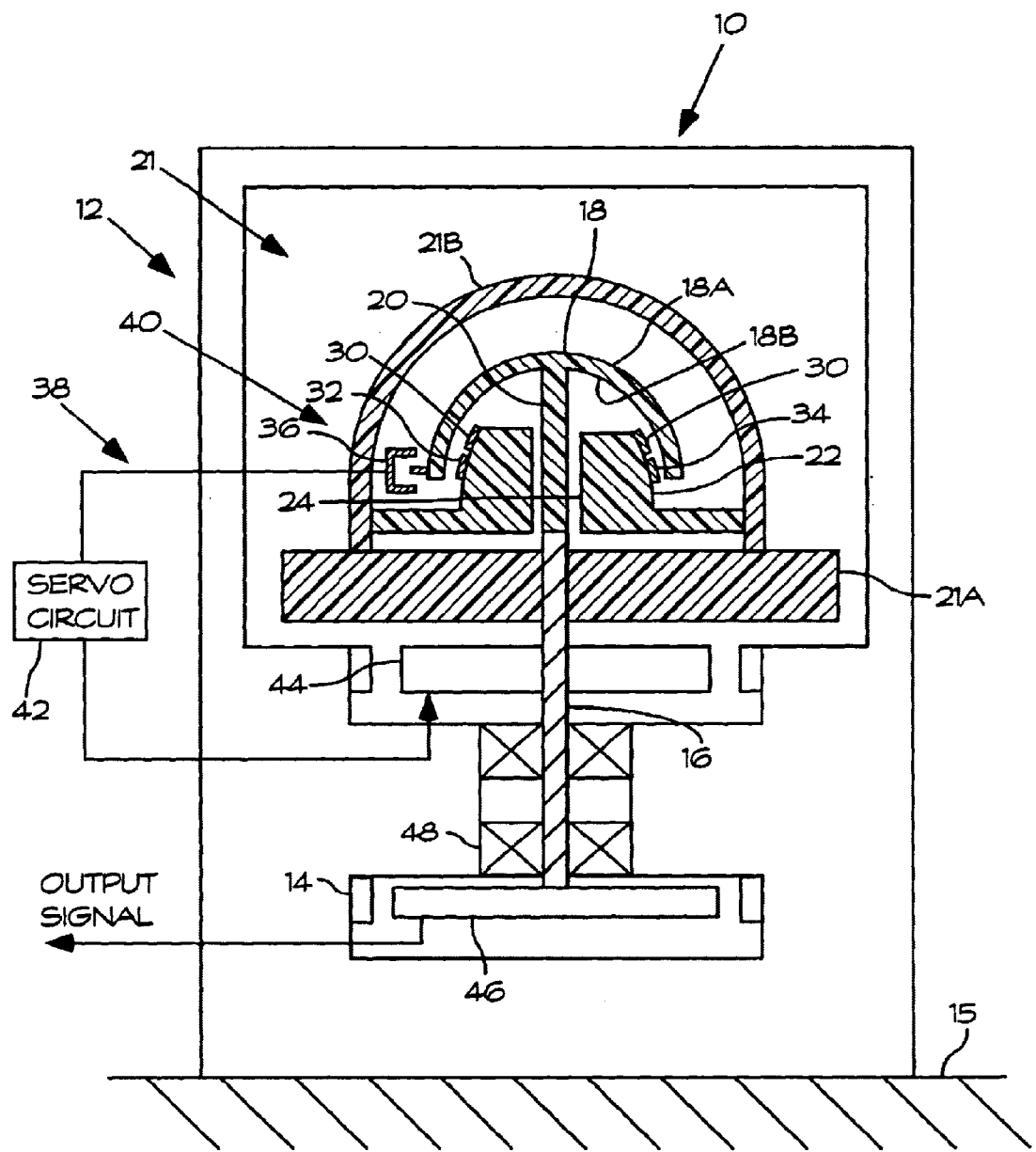
FIG. 1 is a cross sectional view of rotation sensing system according to the invention.

As shown in FIG. 1, a rotation sensing system 10 according to the invention includes a vibratory rotation sensor that preferably comprises a hemispheric resonator gyro (HRG) 12 mounted on a resolver 14 via a shaft 16. FIG. 1 shows a simplified structure for the HRG 102 and resolver 14. The resolver 14 is mounted on a vehicle 15 and is arranged to measure angular displacement between the HRG 12 and the vehicle 15.

Detailed explanations of HRG structures are contained in U.S. Pat. No. 4,157,041, which issued Jun. 5, 1979 to Loper, Jr. et al.; U.S. Pat. No. 4,951,508, which issued Aug. 28, 1990 to Loper, Jr. et al.; U.S. Pat. No. 5,801,310, which issued Sep. 1, 1998 to Matthews et al.; and U.S. Pat. No. 5,983,719, which issued Nov. 16, 1999 to Matthews et al. The entire disclosures of U.S. Pat. Nos. 4,157,041; 4,951,508; 5,801,310; and 5,983,719 are incorporated by reference into the present disclosure.

The HRG structure disclosed in U.S. Pat. No. 4,157,041 is particularly suitable as the HRG 12. This disclosure therefore contains a brief description of the HRG 12 to explain the structure and function of the present invention. Reference should be made to U.S. Pat. No. 4,157,041 for a detailed explanation of the structure of the HRG 12.

As shown in FIG. 1, the HRG 12 includes a resonator 18 that has an integral stem 20 located at the pole of the hemisphere. The resonator 18 preferably has a generally hemispherical shape and is inertially sensitive as explained below. The resonator is preferably formed of fused quartz. The resonator 18 has inner and outer surfaces 18A and 18B that are coated with a metal such as chromium. The shaft 16 is connected to the resonator 18 along an input axis that extends through the stem 20 and the pole of the resonator 18. The resonator 18 is mounted in a housing 21 that includes a base 21A and a dome 21B.

A forcer housing 22 also preferably formed of fused quartz extends into the resonator 18. The forcer housing 22 has a central passage 24 that allows the shaft 16 to extend therethrough. A continuous forcer electrode 30 and a plurality of discrete electrodes 32 and 34, preferably formed of chromium, are bonded on an outer surface 36 of the forcer housing 16. The forcer electrode 30 is a continuous band that extends around the forcer housing. The discrete forcer electrodes 32 and 34 are spaced apart on the forcer housing 22 from the continuous forcer electrode. The cross sectional view shows only two discrete forcer electrodes, however, as well known in the art, the HRG 12 may include sixteen or more discrete forcer electrodes spaced apart around the forcer housing 22. The continuous forcer electrode 30 and the discrete forcer electrodes 32 and 34 are used to induce standing wave vibrations in the resonator 18.

The resonator 18 is excited by application of periodic voltages to the forcer electrodes 30, 32, 34 to establish a standing wave vibration pattern in the resonator 18. Rotation of the resonator 18 about an axis lengthwise through the stem 20 causes the standing waves in the resonator 18 to rotate by an angle that is a function of the angle of rotation of the resonator 18. The HRG 12 typically has a transfer function $$\omega_{in} \to \frac{0.3}{s} \to \theta_{out}$$

such that a rotation angle of 90° produces a precession angle of about 27° in the flexing pattern caused by the standing waves in the resonator. Thus, by measuring the angle of rotation of the standing wave, the angle of rotation of the resonator 18 about the sensing axis can be determined.

Figure 2A:
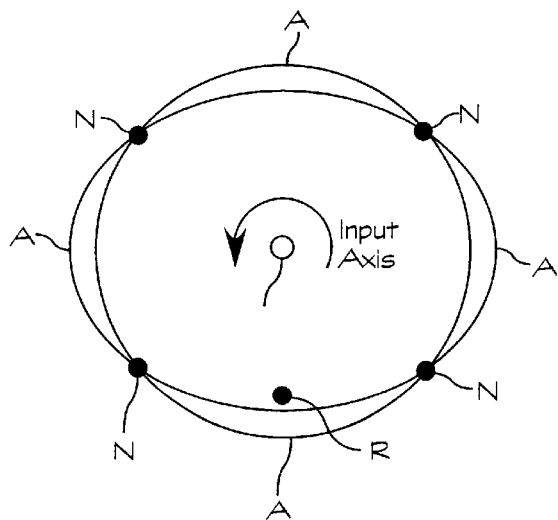
FIGS. 2A and 2B illustrate principles of operation of a hemispherical resonator gyro.
Figure 2B:
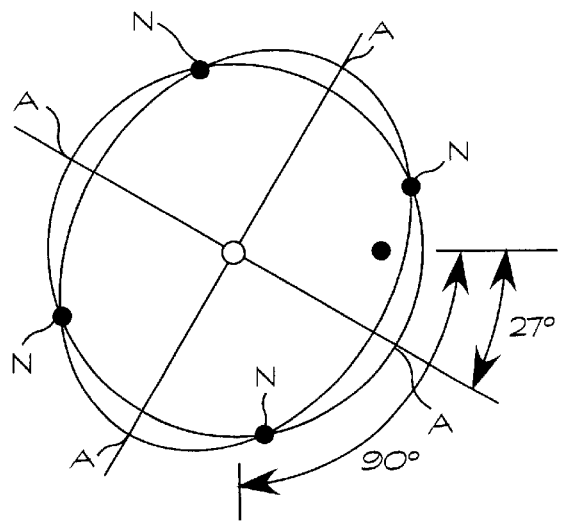
Figure 3:
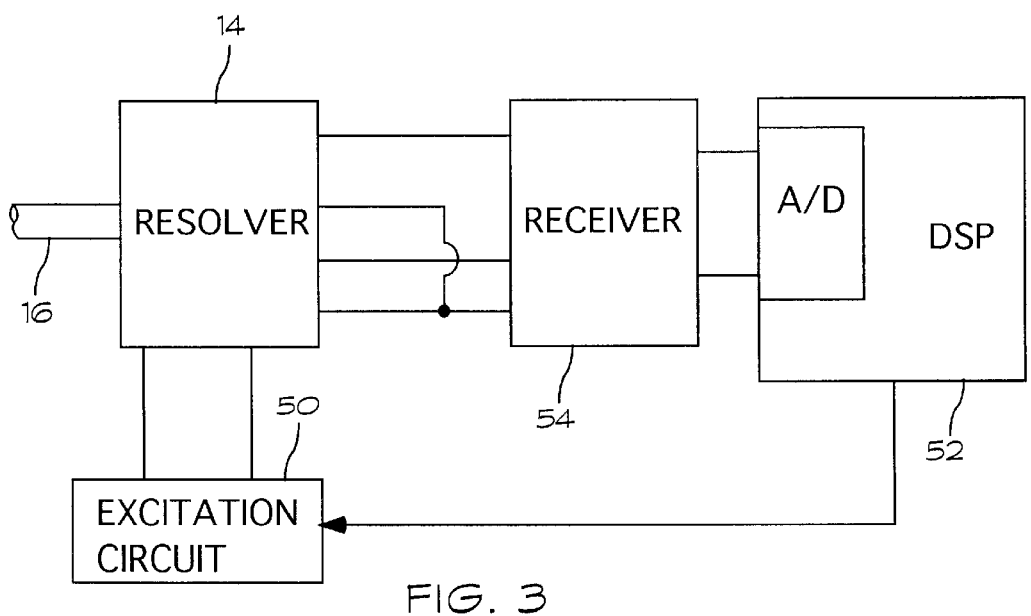
FIG. 3 is a block diagram of a resolver that may included in the rotation sensing system of FIG. 1.

FIG. 2A shows a standing wave pattern having nodes N and antinodes A. A reference point R is indicated on the resonator 18. FIG. 2B shows the relation between rotation of the standing wave pattern and rotation of the resonator 18.

The HRG 12 includes a pickoff assembly 40 that produces an HRG pickoff signal that is a function of capacitance changes caused by rotation of the standing wave pattern in the resonator 18. The HRG pickoff signal may be processed to determine the angle of rotation of the resonator 18 the attached shaft 16. The HRG pickoff signal is input to a servo circuit 42 that is connected between the pickoff assembly 40 and a servo motor 44. The servo circuit produces a feedback signal that is used to control the servo motor 14. In the rotation sensing system 10 the servo circuit and the servo motor 44 are used to null the HRG pickoff signal.

The resolver 14 is basically an angle transducer for measuring rotations of a turntable 46 that is connected to the shaft 16. A bearing 48 maintains the turntable 46 and the shaft 16 in a desired alignment with the HRG 12 while maintaining a low friction support for the HRG 12 on the turntable 46.

Suitable resolver structures for practicing the invention are well known in the art. A brief description of the resolver 14 is included in this disclosure. Detailed descriptions of resolver systems suitable for use in the present invention are contained in U.S. Pat. No. 6,084,376, which issued Jul. 4, 2000 to Piedl et al. and U.S. Pat. No. 4,631,510, which issued Dec. 23, 1986 to Nagarkatti et al. The entire disclosures of U.S. Pat. Nos. 6,084,376 and 4,631,510 are incorporated by reference into the present disclosure.

The resolver 14 preferably is a variable reluctance device as disclosed in U.S. Pat. No. 4,631,510. The resolver 14 includes a rotor (not shown) having two sets of spaced apart windings (not shown) and a stator (not shown) also having two sets of spaced apart windings (not shown). These windings are called rotor windings and stator windings respectively.

The stator coils of the resolver 14 may be excited by a pulse train output from a coil excitation driver circuit 50 having an input is coupled to an output of a processor 52. The processor 52 is preferably a commercially available digital signal processor (DSP) typically used for motion and speed control applications, such as the DSPs available from Texas Instruments and Analog Devices. Such DSPs include integral analog-to-digital input converters and digital outputs that can be pulse width modulated.

The pulse output of the processor 52 has a constant frequency, constant pulse width. The function of this output is to maintain and insure synchronization between the resolver coil excitation and the points at which the outputs of the resolver are sampled. With a square wave pulse excitation, the resolver outputs are square waves amplitude modulated by the sine and cosine functions of the shaft angular position. These sine/cosine modulated outputs of the resolver are coupled as inputs to the processor 52 which, as part of the analog-to-digital conversion process, samples the value of the inputs synchronously with the coil excitation and the peak of each pulse. These sample values, which are converted to digital values for processing, thus provide the values of the modulated envelope of the resolver outputs, i.e. the sine and cosine values, which simplifies the analog-to-digital conversion process. The sample rate can be at the same rate as the coil excitation frequency, which preferably is relatively low, (for example, about 20 kHz), without loss of sine or cosine data. While square wave excitation is used in this illustrative example, other pulse wave forms may be used to excite the resolver stator coils.

A receiver 54 scales and level shifts the resolver outputs, if necessary, to provide a signal properly interfaced to an input of the processor 52. The processor 52 is programmed to convert the digitized sine and cosine values to a shaft angular position value using a suitable prior art resolver algorithm.

The servo motor 44 rotates the HRG 12 about its input axis to maintain the HRG pickoff signal at null, which maintains the standing wave. pattern in a substantially inertially stable state. The shaft 16 is therefore forced to follow the hemispherical resonator 18 as it is rotated to maintain the standing wave pattern to be substantially inertially stable. The resolver 14 has a high accuracy angle readout that measures the angle between the turntable and its supporting base that is mounted to the vehicle. This assembly of the HRG 12, the resolver 14, and the servo system 38 comprises the new rotation sensing system, which can be used in inertial system applications that require both high accuracy whole angle readout and radiation hardening.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A rotation sensing system, comprising:
   a rotation sensor that produces a signal in response to an input rotation about a sensing axis;
   a servo system arranged to rotate the rotation sensor at an angle about the sensing axis that nulls the signal from the rotation sensor such that the rotation sensor is substantially inertially stable; and
   a resolver arranged to measure the angle through which the servo system has rotated the rotation sensor.

2. The rotation sensing system of claim 1 wherein the rotation sensor is comprised of a vibratory rotation sensor.

3. The rotation sensing system of claim 1 wherein the rotation sensor is comprised of a hemispheric resonator gyroscope.

4. The rotation sensor of claim 3 wherein signals output from the hemispheric resonator gyroscope are input to the servo system.

5. The rotation sensing system of claim 3, further comprising:
   a shaft connected between the stem and the resolver; and
   a bearing arranged to support the shaft.

6. The rotation sensing system of claim 4 wherein the servo system includes:
   circuitry for processing signals output from the hemispheric resonator gyroscope to produce a feedback signal; and
   a servomotor connected to the shaft and arranged to receive the feedback signal and rotate the shaft and hemispheric resonator to null signals from the hemispheric resonator gyroscope.

7. The rotation sensing system of claim 1 wherein the resolver is mounted on a vehicle and the resolver is arranged to measure angular displacement between the vehicle and the rotation sensor.

8. A rotation sensing system for measuring angular displacement of a vehicle, comprising:
   a hemispheric resonator gyroscope;
   a shaft connected to the stem in lengthwise alignment with the sensing axis;
   a servo system for processing signals output from the signal pickoff to produce a feedback signal; and
   a servo motor connected to the shaft and arranged to receive the feedback signal and to rotate the hemispheric resonator to null signals from hemispheric resonator gyroscope such that the rotation sensor is substantially inertially stable; and a resolver fixed to the vehicle and connected to the shaft for measuring the angle through which the servo motor has rotated the hemispheric resonator gyroscope relative to the vehicle.

9. A method for sensing rotation, comprising the steps of:

providing a rotation sensor that produces a signal in response to an input rotation about a sensing axis;

arranging a servo system to rotate the rotation sensor at an angle about the sensing axis that nulls the signal from the rotation sensor such that the rotation sensor is substantially inertially stable; and arranging a resolver to measure the angle through which the servo system has rotated the rotation sensor.

10. The method of claim 8 further comprising the step of forming the rotation sensor to comprise a vibratory rotation sensor.

11. The method of claim 8 further comprising the step of forming the rotation sensor to comprise a hemispheric resonator gyroscope that includes a frame, a stem extending from the frame, a hemispherical resonator connected to the stem; and a signal pickoff arranged to provide the signal to the servo system.

12. The method of claim 10, further comprising:

connecting a shaft between the stem and the resolver; and arranging a bearing to support the shaft.

13. The method of claim 11 comprising the steps of:

forming the servo system to comprise circuitry for processing signals output from the signal pickoff to produce a feedback signal;

connecting a servo motor to the shaft; and arranging the servomotor to receive the feedback signal and rotate the shaft and hemispheric resonator to null the signal output from the signal pickoff.

14. The method of claim 8 further comprising the steps of:

mounting the resolver is on a vehicle; and arranging the resolver to measure angular displacement between the vehicle and the rotation sensor.

15. A method for measuring rotations of a vehicle, comprising the steps of:

arranging a hemispherical resonator gyroscope to produce a signal in response to an input rotation about a sensing axis, the hemispherical resonator gyroscope including a frame, a stem extending from the frame, a hemispherical resonator connected to the stem and a signal pickoff;

connecting a shaft to the stem in lengthwise alignment with the sensing axis;

connecting a servo system between the signal pickoff and the shaft, the servo system including circuitry for processing signals output from the signal pickoff to produce a feedback signal;

connecting a servo motor to the shaft; and arranging the servomotor to receive the feedback signal and rotate the shaft and hemispheric resonator to null the signal output from the signal pickoff such that the rotation sensor is substantially inertially stable;

connecting a resolver to the shaft; and arranging the resolver to measure the angle through which the servo system has rotated the rotation sensor relative to the vehicle.

* * * * *